G. W. GREENWOOD.
FIRE-KINDLER.

No. 186,833.  Patented Jan. 30, 1877.

WITNESSES  
INVENTOR  
George W. Greenwood.  
By his Attorneys.

UNITED STATES PATENT OFFICE.

GEORGE W. GREENWOOD, OF COLUMBUS, OHIO.

IMPROVEMENT IN FIRE-KINDLERS.

Specification forming part of Letters Patent No. 186,833, dated January 30, 1877; application filed January 23, 1877.

*To all whom it may concern:*

Be it known that I, GEORGE W. GREENWOOD, of Columbus, in the county of Franklin and State of Ohio, have invented certain new and useful Improvements in Fire-Kindlers, of which the following is a specification:

The object of my invention is to provide from two series of strips a simple, economical, and effective fire-kindling device, through which, when ignited, the air may circulate freely in all directions in order to obtain a perfect draft; and my invention consists of series of grooved interlocking longitudinal and transverse strips, so united together as to leave spaces for the free circulation of air, both in a longitudinal and transverse direction, beneath as well as in an upward direction, through the kindler, which is coated with a resinous or other inflammable substance or compound to render it easily ignitible, as will be hereinafter specifically designated.

Figure 1:
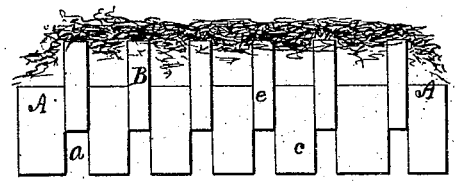
Figure 2:
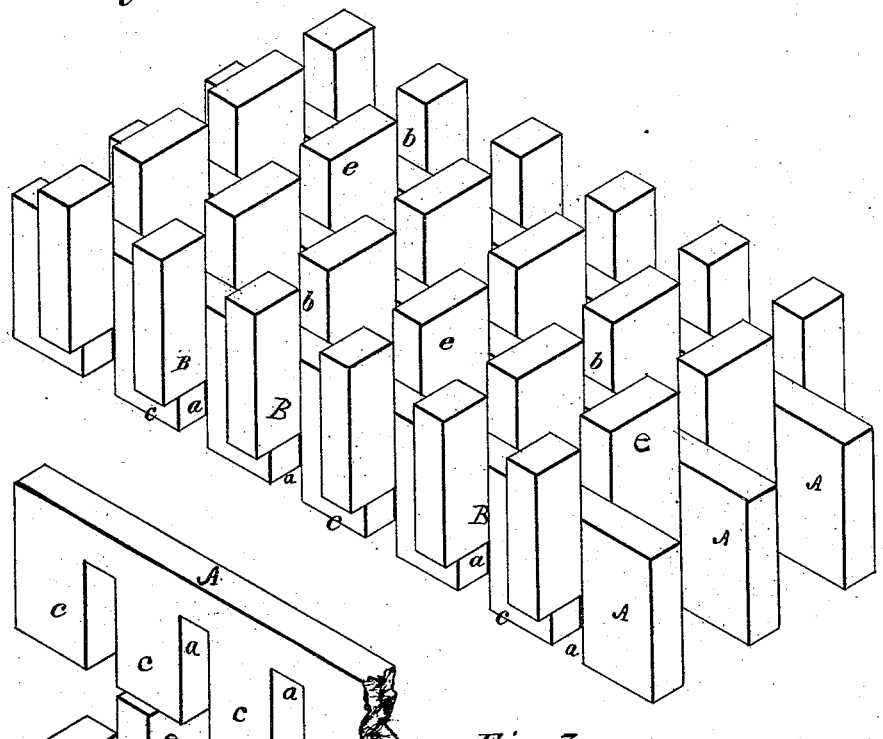
Figure 3:
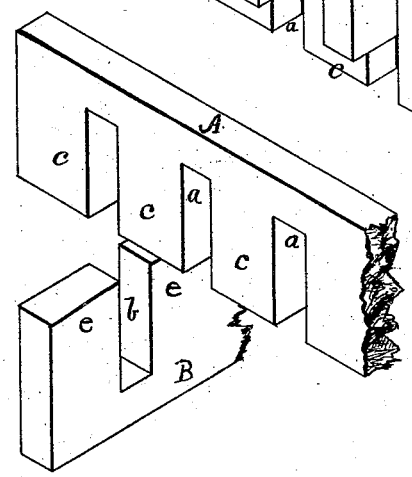

In the accompanying drawings, Figure 1 represents a side elevation of my improved kindler ready for use. Fig. 2 represents a perspective view thereof, the grooved longitudinal and transverse strips being shown as interlocked and ready to receive their inflammable coating; and Fig. 3, a perspective view of a longitudinal and transverse strip about to be united by their interlocking grooves or notches.

In order to carry out my invention I take a number of strips, A A and B B, of any desired thickness and of dry material, suitable for kindling purposes, and provide them with a series of grooves or transverse notches, *a b*, running about three-quarters of their depth, more or less, and at distances apart varying with the sizes of the kindlers and the areas of the draft-passages desired to be formed. The strips are then united in longitudinal and transverse rows, as shown in the drawings, by interlocking the teeth *c c* of the longitudinal strips A with the back or uncut straight portions of the transverse strips B, and the teeth or projections *e e* of the transverse strips B with the backs of the strips A, the grooves in each series of strips permitting of the insertion into them of the backs of the other series, in such manner as to leave the teeth of the one series projecting downward, and those of the other upward, by which mode of construction both longitudinal and transverse passages are formed for the free circulation of air beneath or through the bottom portion of the kindler, as well as vertical spaces, by which a free upward draft is secured, and also intersecting passages through the top, like those at the bottom.

When the frame is thus constructed it is dipped into a bath of resinous or other inflammable matter, which serves, when dry, as an additional means of securing the strips together, and the kindler may also then be transferred to a suitable receptacle containing shavings or their equivalent, or placed upon a board or table covered with shavings, some of which will adhere to the inflammable substance to afford a ready means of igniting it.

The kindler shown in the drawings is composed of three longitudinal and six transverse strips; but, of course, this number may be changed without departing from the spirit of my invention, and the kindler made of any desired size.

I propose, in some instances, to construct my improved kindlers of considerable length, and then divide or cut them into sections, in order to supply them in convenient and suitable size for ordinary purposes. The strips may be grooved in any desired manner or by any proper means; but I have found, in practice, a gang of saws wabbled to cut a groove of the requisite width both an accurate and economical means of attaining this end.

Obviously, the strips may all be formed by a single gang of saws, and in any desired lengths, to be afterward cut into suitable lengths for the longitudinal and transverse pieces. When so formed the saws should be arranged on their mandrel at twice the usual distance apart at intervals corresponding with the lengths into which the strips are to be cut, so that the wide teeth thus formed in the strips may be sawed through to divide the strips and leave the end teeth of the same width as the others.

The kindler may be made square, if desired, instead of rectangular, as shown; and when made of this latter form of strips, formed with large teeth at intervals to admit of their being divided to form the transverse strips, the central teeth of the longitudinal pieces will be about twice the size of the others.

I claim as of my own invention—

A fire-kindler composed of two series of toothed or notched interlocking strips, arranged longitudinally and transversely, and coated with an inflammable substance, substantially as described, whereby longitudinal and transverse intersecting draft-passages are formed, both in the lower and upper portions of the kindler, with vertical openings between them.

In testimony whereof I have hereunto subscribed my name.

G. W. GREENWOOD.

Witnesses:
HENRY T. EARNEST,
GEORGE W. BRECK.